United States Patent
Gopalan et al.

(10) Patent No.: US 8,417,789 B1
(45) Date of Patent: *Apr. 9, 2013

(54) DISTRIBUTED ADAPTIVE NETWORK MEMORY ENGINE

(75) Inventors: Kartik Gopalan, Vestal, NY (US); Michael Hines, Endicott, NY (US); Jian Wang, Vestal, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,319

(22) Filed: Oct. 21, 2011

Related U.S. Application Data

(63) Continuation of application No. 13/073,407, filed on Mar. 28, 2011, now Pat. No. 8,046,425, which is a continuation of application No. 11/957,410, filed on Dec. 15, 2007, now Pat. No. 7,917,599.

(60) Provisional application No. 60/870,325, filed on Dec. 15, 2006.

(51) Int. Cl.
*G06F 15/16* (2006.01)

(52) U.S. Cl.
USPC ............................................ 709/216; 711/100

(58) Field of Classification Search .......... 709/212–216, 709/217, 200, 227; 711/100, 105, 111
See application file for complete search history.

(56) References Cited

U.S. PATENT DOCUMENTS

| | | | |
|---|---|---|---|
| 5,765,205 A * | 6/1998 | Breslau et al. ................ | 711/203 |
| 5,790,530 A | 8/1998 | Moh et al. | |
| 5,887,134 A | 3/1999 | Ebrahim | |
| 6,167,490 A | 12/2000 | Levy et al. | |
| 6,298,419 B1 | 10/2001 | Kontothanassis et al. | |
| 6,766,313 B1 | 7/2004 | Kromann | |
| 6,823,429 B1 * | 11/2004 | Olnowich ..................... | 711/141 |
| 6,836,808 B2 | 12/2004 | Bunce et al. | |
| 6,886,080 B1 | 4/2005 | Carey | |
| 7,188,145 B2 | 3/2007 | Lowery et al. | |
| 7,320,035 B2 | 1/2008 | Kumar et al. | |
| 7,386,673 B2 | 6/2008 | van Riel | |
| 7,451,289 B2 * | 11/2008 | Fujiwara et al. ............. | 711/170 |
| 7,502,318 B2 | 3/2009 | Lindsay | |
| 7,536,462 B2 | 5/2009 | Pandya | |

(Continued)

OTHER PUBLICATIONS

Acharya, et al., "Availability and utility of idle memory in workstation clusters", In Measurement and Modeling of Computer Systems, 1999, 35-46.

(Continued)

*Primary Examiner* — Moustafa M Meky
(74) *Attorney, Agent, or Firm* — Woodcok Washburn LLP

(57) ABSTRACT

Memory demands of large-memory applications continue to remain one step ahead of the improvements in DRAM capacities of commodity systems. Performance of such applications degrades rapidly once the system hits the physical memory limit and starts paging to the local disk. A distributed network-based virtual memory scheme is provided which treats remote memory as another level in the memory hierarchy between very fast local memory and very slow local disks. Performance over gigabit Ethernet shows significant performance gains over local disk. Large memory applications may access potentially unlimited network memory resources without requiring any application or operating system code modifications, relinkling or recompilation. A preferred embodiment employs kernel-level driver software.

20 Claims, 11 Drawing Sheets

Illustration of RMAP Packet Header details

U.S. PATENT DOCUMENTS

| | | | |
|---|---|---|---|
| 7,773,546 | B2 | 8/2010 | Rajakarunanayake et al. |
| 7,917,599 | B1 | 3/2011 | Gopalan et al. |
| 7,920,470 | B2 | 4/2011 | Lindsay |
| 8,046,425 | B1 * | 10/2011 | Gopalan et al. .............. 709/216 |
| 2002/0016840 | A1 | 2/2002 | Herzog et al. |
| 2005/0039180 | A1 | 2/2005 | Fultheim et al. |
| 2006/0015699 | A1 * | 1/2006 | Fujiwara et al. ............. 711/162 |
| 2006/0184673 | A1 | 8/2006 | Liebman |
| 2006/0190243 | A1 | 8/2006 | Barkai et al. |
| 2007/0288530 | A1 | 12/2007 | Romem et al. |
| 2009/0012932 | A1 | 1/2009 | Romem et al. |
| 2009/0059955 | A1 | 3/2009 | Georgiou et al. |
| 2009/0070337 | A1 | 3/2009 | Romem et al. |
| 2009/0138639 | A1 | 5/2009 | Lindsay |
| 2009/0144388 | A1 | 6/2009 | Gross et al. |
| 2009/0150511 | A1 | 6/2009 | Gross et al. |

OTHER PUBLICATIONS

Amza, et al., "Treadmarks: Shared memory computing on networks of workstations", IEEE Computer, 29(2):18-28, Feb. 1996.

Anderson, et al., "A case for NOW (Networks of Workstations)", IEEE Micro, 15(1): 54-64, 1995.

Anderson, et al., "Serverless network file systems", In Proc. of the 15th Symp. on Operating System Principles, Dec. 1995, 109-126, Copper Mountain, Colorado.

Bohannon, et al., "The architecture of the Dali main memory storage manager", Bell Labs Technical Journal, 2 (1): 36-47, 1997.

Brasileiro, et al., "Using remote memory to stabilise data efficiently on an EXT2 linux file system", In Proc. of the $20^{th}$ Brazilian Symposium on Computer Networks, May 2002, 1-16.

Comer, et al., "A new design for distributed systems: the remote memory model", Proceedings of the USENIX 1991 Summer Technical Conference, 127-135, 1991.

Cuenca-Acuna, et al., "Cooperative caching middleware for cluster-based servers", In Proc. of $10^{th}$ IEEE Inti. Symp. on High Performance Distributed Computing (HPDC-10), Aug. 2001, 1-12.

Dahlin, et al., "Cooperative caching: Using remote client memory to improve file system performance", In Operating Systems Design and Implementation, 267-280, 1994.

Dwarkadas, et al., "Cashmere-VLM: Remote memory paging for software distributed shared memory", In Proc. of Inti. Parallel Processing Symposium, San Juan, Puerto Rico, 153-159, Apr. 1999.

E. Stark Samson: A scalable active memory server on a network, Aug. 2003.

Feeley, et al., "Implementing global memory management in a workstation cluster", Operating Systems Review, Fifteenth ACM Symposium on Operating Systems Principles, 29(5):201-212, 1995.

Flouris, et al., "The network RamDisk: Using remote memory on heterogeneous NOWs", Cluster Computing, 2 (4):281-293, 1999.

Garcia-Molina, et al., "A massive memory machine", IEEE Transactions on Computers, C-33 (5):391-399, 1984.

Garcia-Molina, et al., "Data management with massive memory: a summary", Parallel Database Systems, PRISMA Workshop, 63-70, 1991.

Hines, et al., "Anemone: Transparently Harnessing Cluster-Wide Memory", In Proc. of International Symposium on Performance Evaluation of Computer and Telecommunication Systems (SPECTS'06), Aug. 2006, Calgary, Alberta, Canada, 8 pages.

Hines, et al., "Fast Transparent Cluster-Wide Paging", Spring 2006, Florida State University Department of Computer Science, 6 pages.

Hines, et al., "Anemone: Adaptive Network Memory Engine", SOSP 2005 and NSDI 2005, Florida State University Department of Computer Science (poster), 1 page.

Hines, M., "Anemone: An Adaptive Network Memory Engine", Master's Thesis, Florida State University, Apr. 2005, 1-41.

Ioannidis, et al., "On using network memory to improve the performance of transaction-based systems", In International Conference on Parallel and Distributed Processing Techniques and Applications (PDPTA '98), 1998.

Koussih, et al., "Dodo: A user-level system for exploiting idle memory in workstation clusters", In Proc. of the Eighth IEEE Inti. Symp. on High Performance Distributed Computing (HPDC-8), 1999.

Leslie, et al., "The design and implementation of an operating system to support distributed multimedia applications", IEEE Journal of Selected Areas in Communications, 14(7):1280-1297, Sep. 1996.

Lewandowski, M., "Latency Reduction Techniques for Remote Memory Access in Anemone", Master's Thesis, Florida State University, Dec. 2005, 1-43.

Markatos, et al., "Implementation of a reliable remote memory pager", In USENIX Annual Technical Conference, 177-190, 1996.

McDonald, "Remote paging in a single address space operating system supporting quality of service", Tech. Report. Dept. of Computing Science, University of Glasgow, Scotland, UK, 1999.

NS2: Network Simulator. http://www.isi.edu/nsnam/ns/.

POV-Ray, The persistence of vision raytracer, 2005.

Silicon Graphics, Inc. STL Quicksort www.sgi.com/tech/stl/sort.html.

Wong, et al., "My cache or yours? Making storage more exclusive", In Proc. of the USENIX Annual Technical Conference, 161-175, 2002.

Xiao, et al., "Incorporating job migration and network RAM to share cluster memory resources", In Proc. of the 9th IEEE Inti. Symposium on High Performance Distributed Computing (HPDC-9), 71-78, Aug. 2000.

* cited by examiner

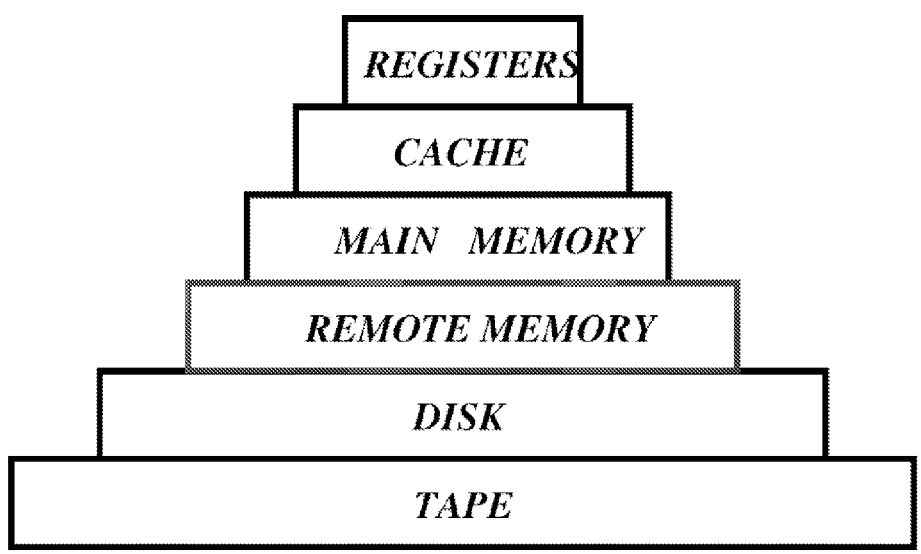
Figure 1: The position of remote memory in the memory hierarchy.

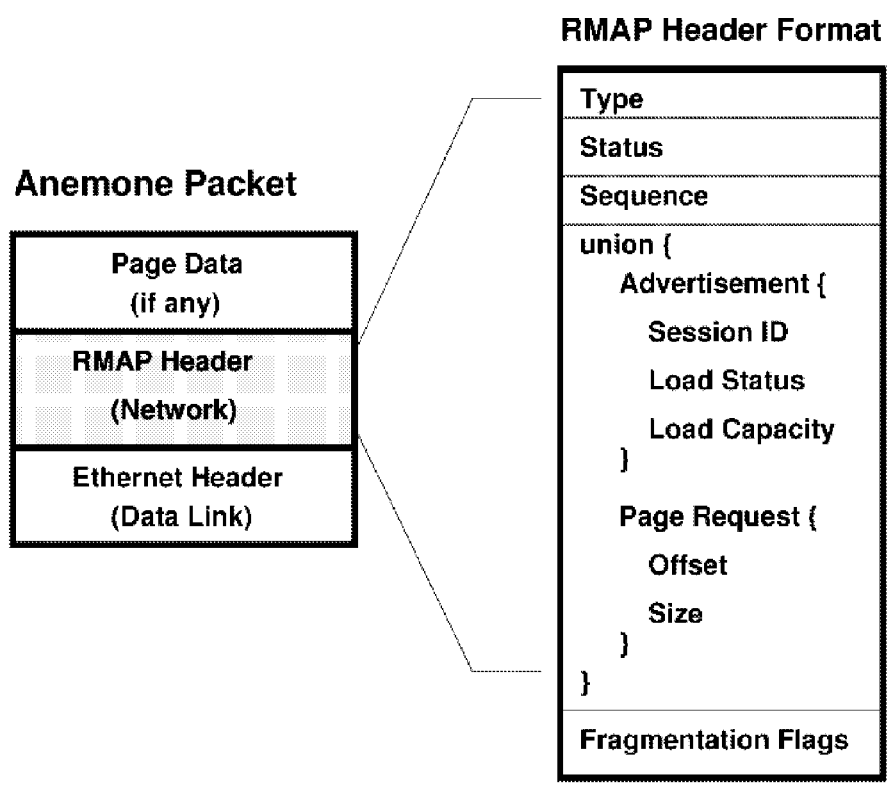
Figure 2: Illustration of RMAP Packet Header details

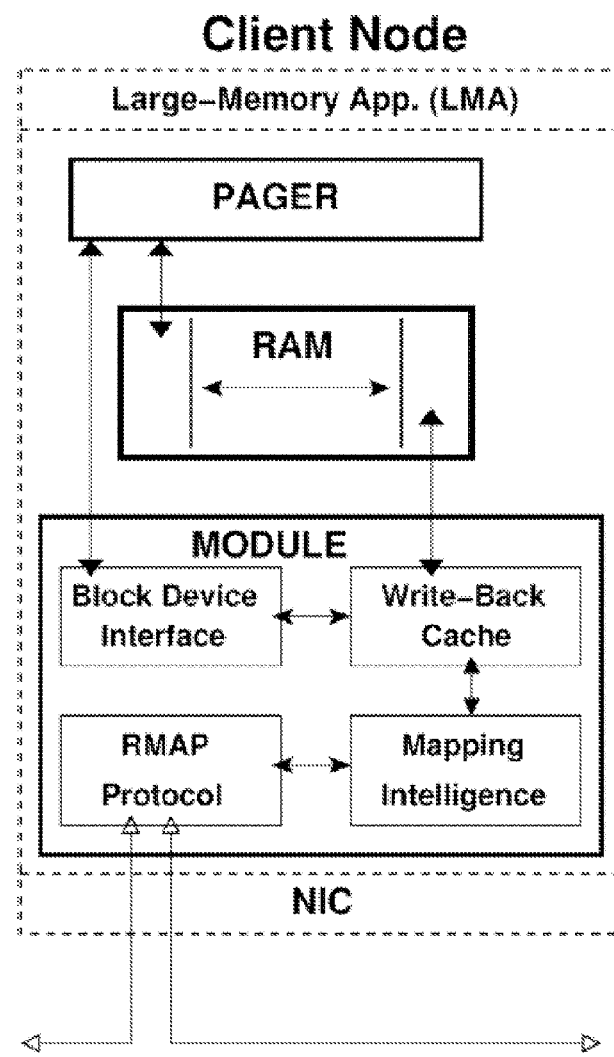
Figure 3: The components of the client node.

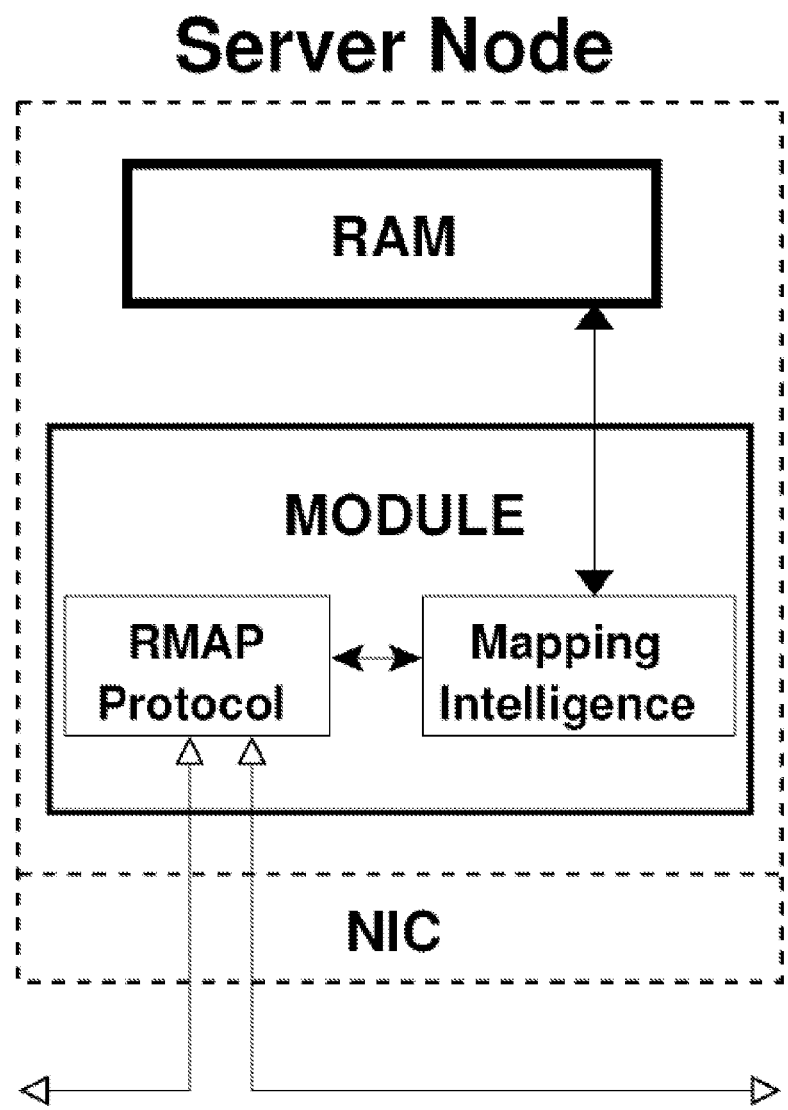
Figure 4: The components of the server node.

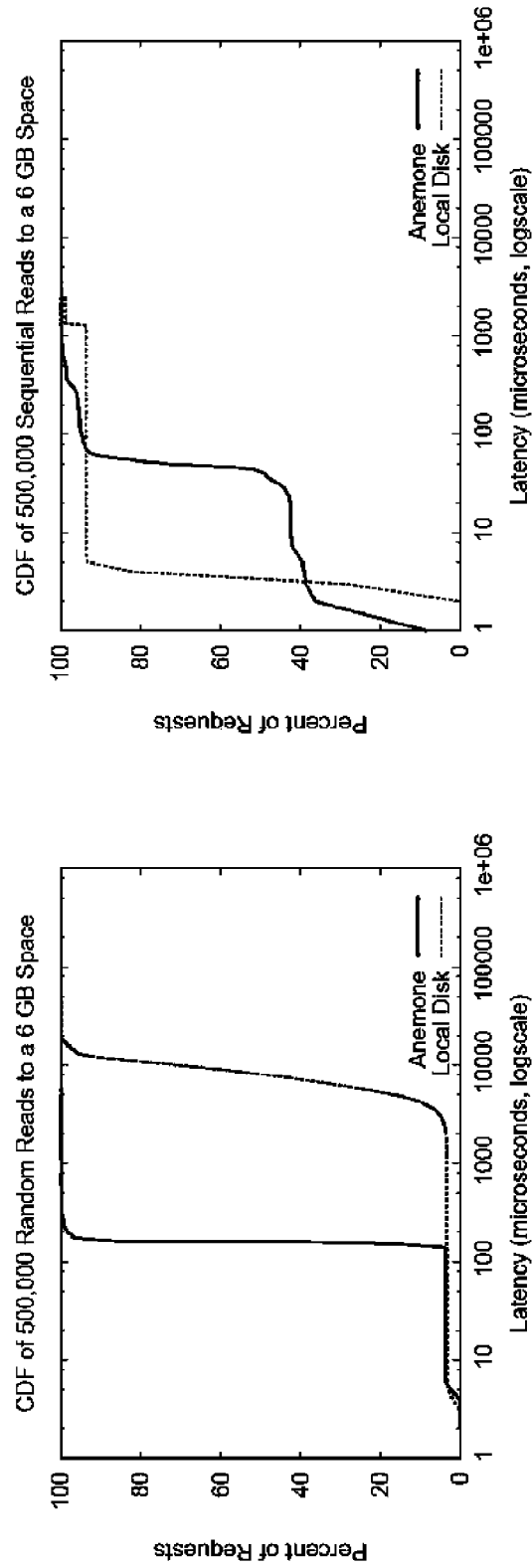
Figure 5: Comparison of latency distributions for random and sequential reads for Anemone and disk.

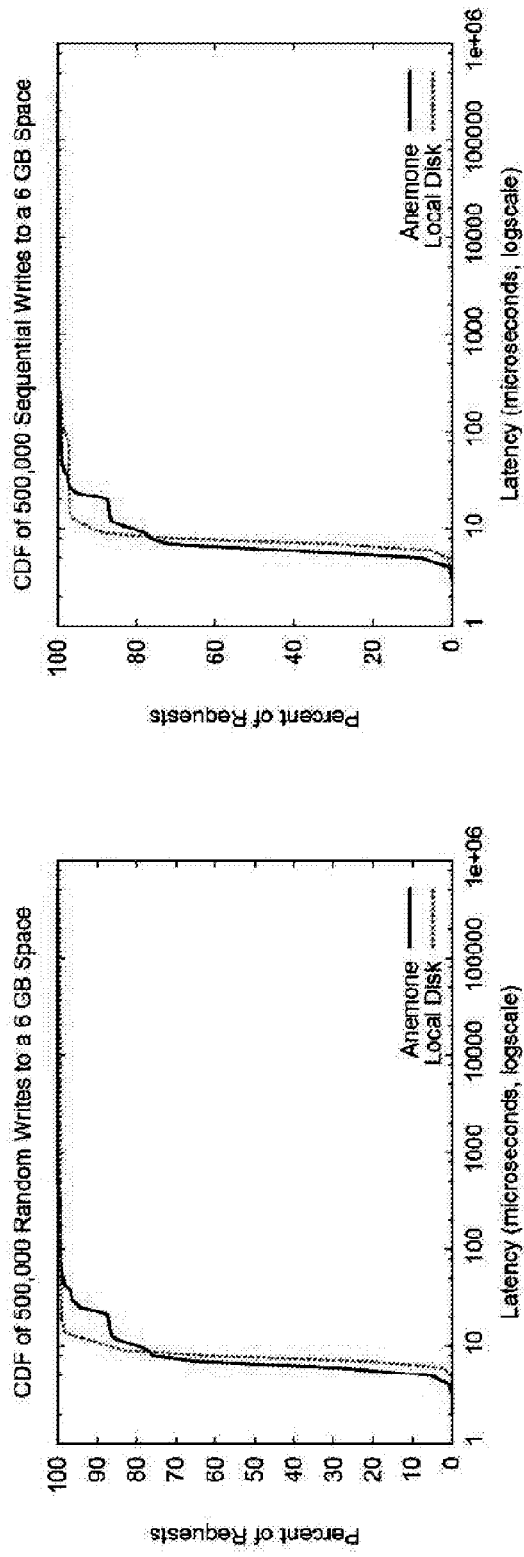
Figure 6: Comparison of latency distributions for random and sequential writes for Anemone and disk.

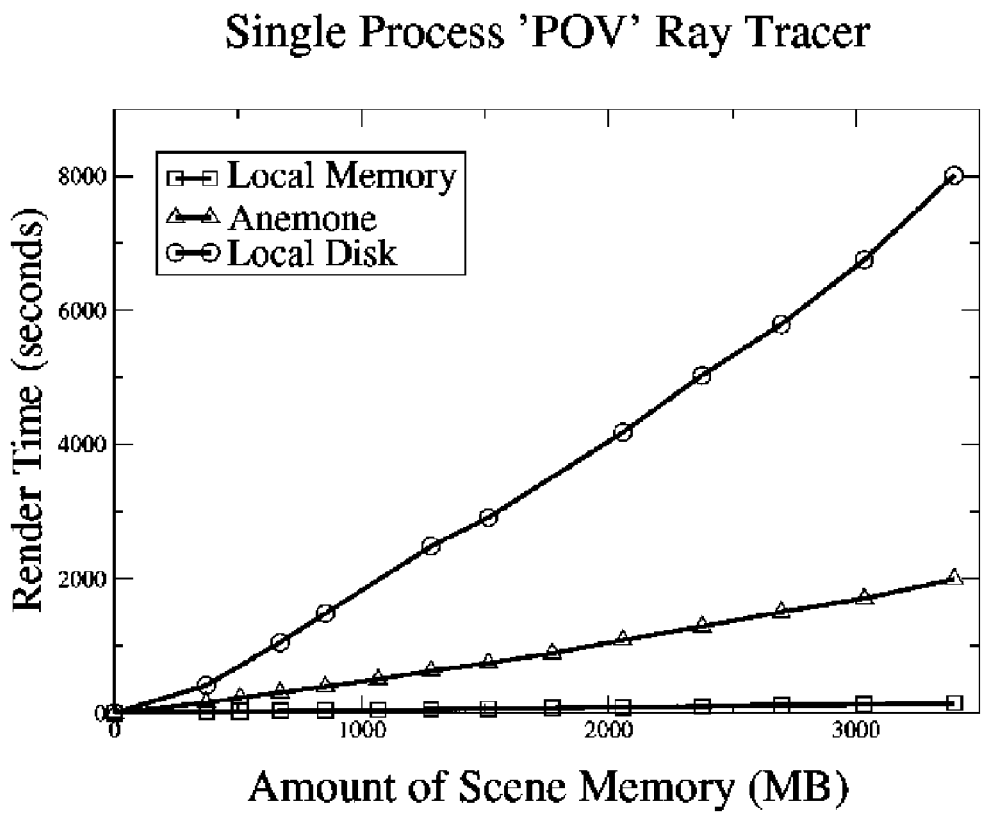
Figure 7: Comparison of execution times of POV-ray for increasing problem sizes.

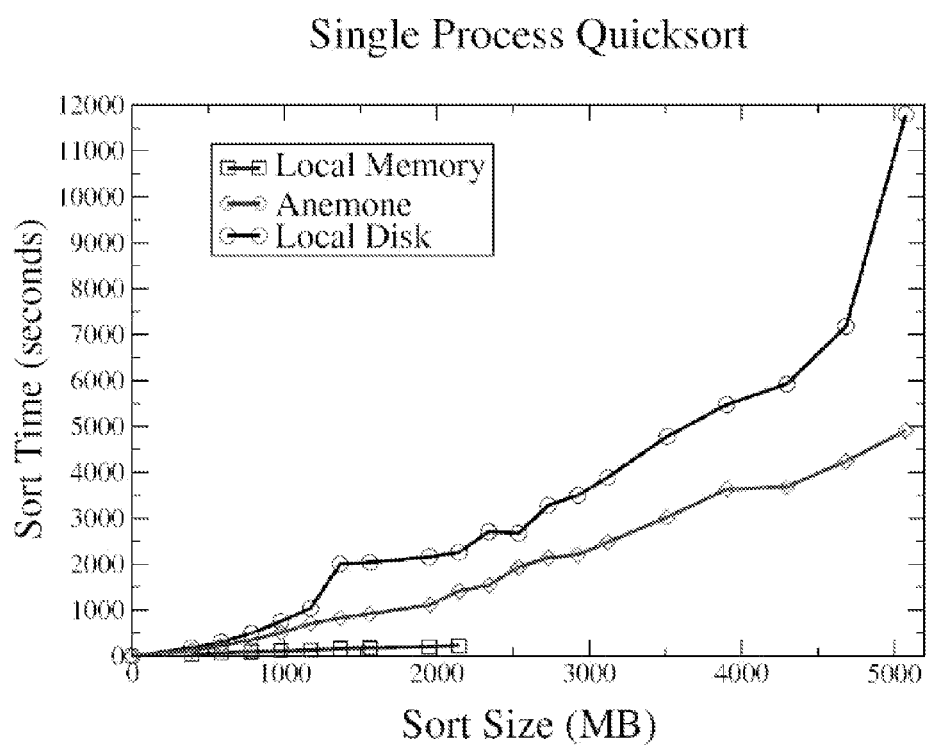
Figure 8: Comparison of execution times of STL Quicksort for increasing problem sizes.

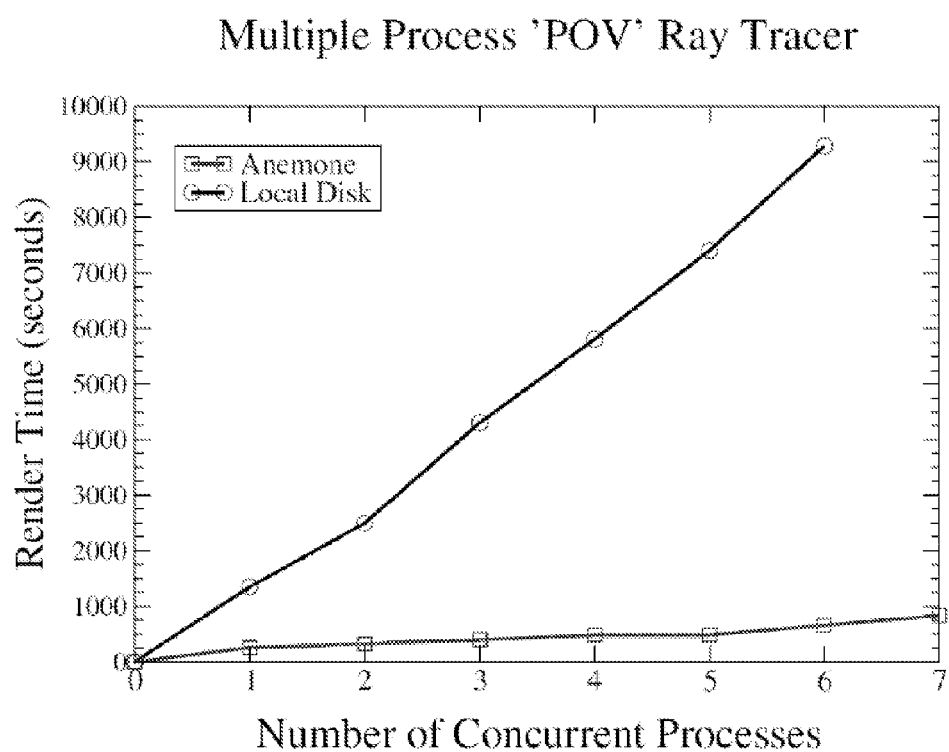
Figure 9: Comparison of execution times of multiple concurrent processes executing POV-ray for increasing number of processes.

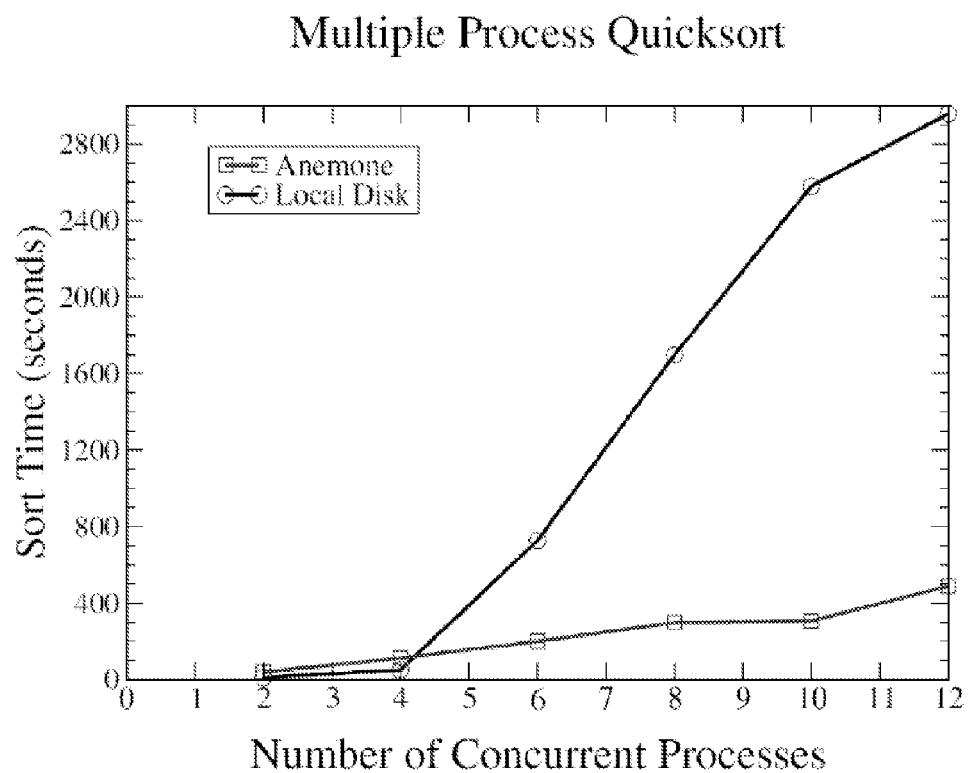
Figure 10: Comparison of execution times of multiple concurrent processes executing STL Quicksort for increasing number of processes.

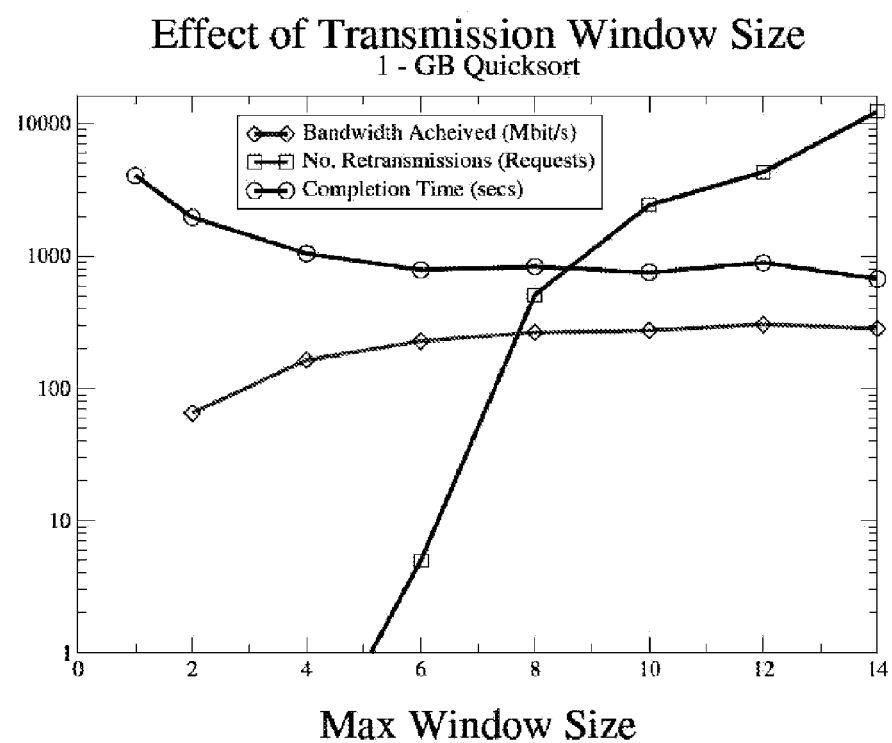
Figure 11: Effects of varying the transmission window using Quicksort.

DISTRIBUTED ADAPTIVE NETWORK MEMORY ENGINE

RELATED APPLICATIONS

The present application is a Continuation of U.S. patent application Ser. No. 13/073,407, filed Mar. 28, 2011, now U.S. Pat. No. 8,046,425, issued Oct. 25, 2011, which is a Continuation of U.S. patent application Ser. No. 11/957,410, filed Dec. 15, 2007, now U.S. Pat. No. 7,917,599, issued Mar. 29, 2011, which claims benefit of priority from U.S. Provisional Patent Application No. 60/870,325, filed Dec. 15, 2006, the entirety of which are expressly incorporated herein by reference.

STATEMENT OF GOVERNMENT INTEREST

This invention was made with government support under Grant No. 0509131 awarded by the National Science Foundation. The U.S. Government has certain rights in the invention.

BACKGROUND OF THE INVENTION

Rapid improvements in DRAM capacities have been unable to keep up with the unprecedented the growth in memory demands of applications, such as multimedia/graphics processing, high resolution volumetric rendering, weather prediction, large-scale simulations, and large databases. The issue is not whether one can provide enough Dynamic Random Access Memory (DRAM) to satisfy these modern memory-hungry applications; rather, provide more memory and they'll use it all up and ask for even more. Simply buying more memory to plug into a single machine is neither sustainable nor economical for most users because (1) the price per byte of DRAM within a single node increases non-linearly and rapidly, (2) memory bank limitations within commodity nodes prevent unrestricted scaling and (3) investments in large memory servers with specialized hardware are prohibitively expensive and such technology itself quickly becomes obsolete.

In this constant battle to break-even, it does not take very long for large memory applications to hit the physical memory limit and start swapping (or paging) to physical disk, which in turn throttles their performance. At the same time, it is often the case that while memory resources in one machine might be heavily loaded, large amounts of memory in other machines in a high-speed Local Area Network (LAN) might remain idle or under-utilized. In typical commodity clusters, one often sees a mixed batch of applications of which some have very high memory demands, while most have only low or moderate demands and the cluster-wide resource utilization levels range around 5% to 20%.

Consequently, instead of paging directly to a slow local disk, one could significantly reduce access latencies by first paging over a high-speed LAN to the unused memory of remote machines and then turn to disk-based paging only as the last resort after exhausting the available remote memory. As shown in FIG. 1, remote memory access can be viewed as another level in the traditional memory hierarchy which fills the widening performance gap between very low latency access to main memory and high latency access to local disk. In fact, remote memory paging latencies of about 200 μs or less can be easily achieved whereas the latency of paging to slow local disk (especially while paging in) can be as much as 6 to 13 ms depending upon seek and rotational overheads. Thus remote memory paging could potentially be one to two orders of magnitude faster than paging to slow local disks. Recent years have also seen a phenomenal rise in affordable gigabit Ethernet LANs that provide low latency, support for jumbo frames (packet sizes greater than 1500 bytes), and offer attractive cost-to-performance ratios.

An interesting question naturally follows from the above discussion: Can we transparently virtualize (or pool together) the collective unused memory of commodity nodes across a high-speed LAN and enable unmodified large memory applications to avoid the disk access bottleneck by using this collective memory resource?

Prior efforts [6, 11, 10, 16, 18, 12, 19, 22] to address this problem have either relied upon expensive interconnect hardware (such as Asynchronous Transfer Mode (ATM) or Myrinet switches) or used bandwidth limited 10 Mbps or 100 Mbps networks that are far too slow to provide meaningful application speedups. In addition, extensive changes were often required either to the large memory applications or the end-host operating system or even both. Note that the above research question of transparent remote memory access is different from the research on Distributed Shared Memory (DSM) [9] systems that permit nodes in a network to behave as if they were shared memory multiprocessors, often requiring the use of customized application programming interfaces.

Anemone (The Adaptive NEtwork MemOry engiNE) is a low-latency remote memory access mechanism, having centralized control, which pools together the memory resources of many machines in a clustered network of computers. It then presents a transparent interface to client machines in order to use the collective memory pool in a virtualized manner, providing potentially unlimited amounts of memory to memory-hungry high-performance applications. Anemone as known provides a centralized control engine architecture, as separate nodes and specialized on a network, through which memory transfers pass.

In a machine, the bottleneck on processing is usually I/O (Input/Output) between the various devices in the system, one of the slowest of which is the magnetic disk memory system.

The measured latency in servicing a disk request (including seek, rotational, and transfer delays) typically ranges from 4 to 11 ms on Enhanced IDE S.M.A.R.T. II ATA/100 disks, a common disk memory type. Even more advanced disk systems do not necessarily close the performance gap with common system memory systems, such as DDR2. Such latencies can dramatically limit the processing rate of modern systems.

Applications including the NS-2 simulator, the POV-ray ray-tracing program, and Quicksort, demonstrate disk-based page-fault latencies range between 4 and 11 milliseconds, and average about 9.2 milliseconds, whereas experiments on the known Anemone demonstrated an average of latency of 500 μS and thus is approximately 19.6 times faster than using the disk. In contrast to the disk-based paging, the known Anemone reduced the execution time of single memory-bound processes by half. Additionally, the known Anemone reduced the execution times of multiple, concurrent memory-bound processes by a factor of 7.7 on the average.

A modern trend is the increasing use of cluster or network of commodity machines that are relatively inexpensive. It is often the case that most machines in such a network or cluster are underutilized most of the time. That is, the cost of including 100 GB of main memory in a single machine is possibly more than 100 times the cost of common computers (which may each be configured with 1 GB of memory and have a 4 GB memory limit).

Prior efforts to make use of unused memory of remote clients either required extensive changes to the client machines that wanted to use remote memory or were designed as combined address-space mechanisms intended for access to non-isolated memory objects. Earlier disclosures of the project leading to the present invention implemented and evaluated a high-performance, transparent, and virtualized means of aggregating the remote memory in a cluster, requiring neither modifications to the client system nor the memory-bound applications running on them.

Anemone strives to aggregate the collective resources of those machines for use by clients and then provides access to that combined remote memory through a method called virtualization. Virtualization refers to the process of transparently dividing a pool of physical resources into a set of virtual resource shares among multiple users. For example, random access semiconductor memory is a clear target for such aggregation, though other resources may also be aggregated, such as processing capacity, numeric and/or graphics coprocessors, hard-disk storage, etc.

Anemone is a centrally controlled system that makes available remote memory resources of machines distributed on the network cluster are contributing, and provides a unified virtual interface to access this memory space for any client machine. Anemone provides an interface through the use of NFS (Network File System), allowing the client to transparently interact with the Anemone system without modifications to the client. Second, the Anemone client sees a highly scalable, almost unlimited pool of memory to which it can use as the needs of the cluster grow or the state of the cluster changes. This remote memory can be viewed as another level in the standard memory hierarchy of today's systems, sitting between the disk and RAM. Third, Anemone provides foundations for virtualizing other distributed resource types such as storage and computation.

Anemone is the first system that provides unmodified large memory applications with a completely transparent and virtualized access to cluster-wide remote memory over commodity gigabit Ethernet LANs. The earliest efforts at harvesting the idle remote memory resources aimed to improve memory management, recovery, concurrency control, and read/write performance for in-memory database and transaction processing systems [14, 13, 4, 15]. The first two remote paging mechanisms [6, 11] incorporated extensive OS changes to both the client and the memory servers and operated upon 10 Mbps Ethernet. The Global Memory System (GMS) [11] was designed to provide network-wide memory management support for paging, memory mapped files and file caching. This system was also closely built into the end-host operating system and operated upon a 155 Mbps DEC Alpha ATM Network. The Dodo project [16, 1] provides a user-level library based interface that a programmer can use to coordinate all data transfer to and from a remote memory cache. Legacy applications must be modified to use this library. Work in [18] implements a remote memory paging system in the DEC OSF/1 operating system as a customized device driver over 10 Mbps Ethernet. A remote paging mechanism [19] specific to the Nemesis [17] operating system was designed to permit application-specific remote memory access and paging. The Network RamDisk [12] offers remote paging with data replication and adaptive parity caching by means of a device driver based implementation, but does not provide transparent remote memory access over Gigabit Ethernet as the known Anemone system does. Other remote memory efforts include software distributed shared memory (DSM) systems [9, 25]. DSM systems allow a set of independent nodes to behave as a large shared memory multiprocessor, often requiring customized programming to share common data across nodes. This is much different from the Anemone system which allows unmodified application binaries to execute and use remote memory transparently. Samson [22] is a dedicated memory server over Myrinet interconnect that actively attempts to predict client page requirements and delivers the pages just-in-time to hide the paging latencies. The drivers and OS in both the memory server and clients are also extensively modified. Simulation studies for a load sharing scheme that combines job migrations with the use of network RAM are presented in [24]. This is quite feasible but would again involve adding extra policy decisions and modifications to the kernel. The NOW project [2] performs cooperative caching via a global file cache [8] in the xFS file system [3], while [23] attempts to avoid inclusiveness within the cache hierarchy. Remote memory based caching and replacement/replication strategies have been proposed in [5, 7], but these do not address remote memory paging in particular.

The known Centralized Anemone enabled unmodified LMAs to transparently access the collective memory in a gigabit LAN, without requiring any code changes, recompilation, or relinking. It relied upon a central Memory Engine to map and deliver memory pages to/from servers in the cluster. Centralized Anemone only allows clients to swap to pre-sized remote memory regions pulled from the Anemone system— for each client in the system, these regions are all disjoint, and no two clients using the Anemone system ever share any part of their memory space with each other.

See, Mark Lewandowski, "Latency Reduction Techniques for Remote Memory Access in ANEMONE", Master's Thesis, Florida State University, Spring, 2006; Michael R. Hines, "Anemone: An Adaptive Network Memory Engine", Master's Thesis, Florida State University, Spring, 2005; Jian Wang, Mark Lewandowski, and Kartik Gopalan, "Anemone: Adaptive Network Memory Engine", SOSP 2005 and NSDI 2005 (poster); Jian Wang, Mark Lewandowski, and Kartik Gopalan, "Fast Transparent Cluster-Wide Paging", Spring 2006; Michael Hines, Mark Lewandowski, Jian Wang, and Kartik Gopalan, "Anemone: Transparently Harnessing Cluster-Wide Memory", In Proc. of International Symposium on Performance Evaluation of Computer and Telecommunication Systems (SPECTS'06), August 2006, Calgary, Alberta, Canada, each of which is expressly incorporated herein by reference in its entirety.

SUMMARY OF THE INVENTION

Memory demands of large-memory applications (LMAs) continue to outpace the growth in DRAM capacities of commodity systems. For example, applications such as multimedia, image processing, simulations, and database processing often require large amounts of memory. Such applications quickly hit the physical memory limit and start paging (or swapping) to physical disk, which incurs large seek latencies. At the same time, affordable gigabit Ethernet technology has become commonplace with very low latencies and support for jumbo frames (packets larger than 1500 bytes). Consequently, instead of paging to a slow local disk, one could page over a gigabit Ethernet LAN to the unused memory of remote machines and use the disk as a last resort after exhausting remote memory.

When executing large memory applications such as graphics rendering program POV-ray, the network simulator NS-2, K-nearest neighbor search algorithm, and large in-memory Quicksort, Distributed Anemone, a preferred embodiment of the invention, speeds up single process large memory applications by a factor of 1.5 to 4 and multiple concurrent processes by a factor of 14 when compared against disk based paging. Average page-fault latencies are reduced from 8.3 ms with disk based paging to 160 µs with Anemone. Another key advantage of Anemone is that this performance improvement is achieved with no modifications whatsoever to the client's operating system or to the memory-bound applications.

The Distributed Adaptive Network Memory Engine (Anemone) is the first system that provides transparent remote memory access for LMAs over commodity Gigabit Ethernet. Anemone enables unmodified LMAs to transparently access the collective memory in a gigabit LAN, without requiring any code changes, recompilation, or relinking. However, the known implementation is incompletely developed. The present invention provides various enhancements to this system to address reliability, improve performance, and improve usefulness. See, Michael Hines, Jian Wang and Kartik Gopalan, "Distributed Anemone: Transparent Low-Latency Access to Remote Memory in Commodity Clusters", To appear in Proc. of International Conference on High-Performance Computing (HiPC), December 2006, Bangalore, India, expressly incorporated herein by reference.

The present invention thus provides a number of improvements to the previously known Anemone system, including distributed resource control and fault tolerance. The ultimate consequence of failure in swapping to remote memory, according to the present invention, is no worse than failure in swapping to local disk. However, the probability of failure is greater in a LAN environment cause of multiple components involved in the process, such as network cards, connectors, switches etc. There are two feasible alternatives for fault-tolerance. (1) To maintain a local disk-based copy of every memory page swapped out over the network. This provides same level of reliability as disk-based paging, but risks performance interference from local disk activity. This is especially useful where disk write operations may be performed faster than disk reads, for example due to dynamic buffer allocation based on disk and head position, to avoid disk latencies; and (2) To keep redundant copies of each page on multiple remote servers. This second approach avoids disk activity and reduces recovery-time, but may consume bandwidth, reduces global memory pool and is susceptible to network failures. Both techniques may be employed in conjunction.

A low-latency storage and memory mapping mode is also provided. The system according to the present invention can potentially be used in two other modes, besides swapping over the network. First mode is to host a low-latency file system or temporary storage space that resides on remote memory instead of local disk. This is possible because the client module presents remote memory using a pseudo-block device interface. Such remote-memory-based file systems would be much faster to access than those residing on local disk, thus providing substantial speedups for applications such as database processing and web services.

Another mode is to allow applications to map the contents of remote memory to their local address space using mmap( ) operation. Thus another aspect of the present invention provides such an interface through which applications can use remote memory in a transparent manner, without needing to depend on a swapping mechanism.

A further aspect of the invention provides adaptation to resource variation: As memory contributors constantly join in or leave the network, the system according to the present invention preferably: (1) seamlessly absorbs the increase/decrease in cluster-wide memory capacity, insulating the clients from resource fluctuations, and providing a graceful transfer of responsibility for already allocated memory at nodes leaving the network to the other nodes; (2) allow any server to reclaim part or whole of its contributed memory by transparently migrating pages to other less loaded servers.

Thus the system according to the present invention scales by growing and shrinking the size of its aggregated memory space dynamically and gracefully falls back to disk-based virtual memory in case the remote memory pool is over-committed.

The system according to the present invention provides a solution to bridge the growing performance gap between very fast access to local memory and very slow access to local disk.

On a high level, the goal of distributed Anemone system is to enable large memory applications (LMAs) to transparently utilize unused memory from other machines across the network. No single entity in the network is responsible for the global accounting/management of unused memory, load-balancing among memory contributors (servers) or transfer of memory pages. Anemone has two software components to achieve this objective—the client module on low memory machines and the server module on machines with unused memory.

The client module appears to the client system simply as a block device that can be configured as the primary swap device. Whenever an LMA needs memory beyond that available locally at the client, the Pager (swap daemon) in the client pages out or pages in additional memory pages between the client machine and other server machines in the cluster. As far as client system (including the Pager) is concerned, the client module just appears to be a block device that is no different from any disk-based block device. Internally, however, the client module maps the swapped out pages to remote memory of different servers. The page-to-server mapping logic accounts for each server's availability and load.

The servers themselves are just like any other commodity machines in the network that happen to have unused memory to contribute. In fact, a machine can switch between the roles of a client and server at different times, depending upon its memory requirements. Client machines can discover the unused memory resources on different servers using a simple distributed resource discovery mechanism. Servers provide regular feedback about their load information to clients, both as a part of the resource discovery process and as a part of regular paging process. Clients use this feedback information to select the server for each new page-out operation. For instance, a client can simply choose the least loaded server node to sends a new page. Additionally, both the clients and servers a soft-state refresh protocol to maintain the liveness of pages stored at the servers.

The earlier known Centralized Anemone prototype differed from Distributed Anemone in that the page-to-server mapping logic was maintained at a central Memory Engine, instead of individual client nodes. Although simpler to implement, this architecture incurs two extra round trip times on each paging request besides forcing all traffic to go through the central Memory Engine, which can become a single point of failure and significant bottleneck.

BRIEF DESCRIPTION OF THE DRAWINGS

FIG. 1 shows a basic architecture of a system memory according to the present invention;

FIG. 2 shows the RMAP packet header details;

FIG. 3 shows the components of a client node;

FIG. 4 shows the components of a server node;

FIG. 5 compares the cumulative distributions of latencies with disk and Distributed Anemone for random and sequential read requests;

FIG. 6 compares the cumulative distributions of latencies with disk and Distributed Anemone for random and sequential write requests;

FIG. 7 shows a comparison of execution times of POV-ray for increasing problem sizes;

FIG. 8 shows a comparison of execution times of STL Quicksort for increasing problem sizes;

FIG. 9 shows a comparison of execution times of multiple concurrent processes of POV-ray for increasing number of processes;

FIG. 10 shows a comparison of execution times of multiple concurrent processes of STL Quicksort for increasing number of processes; and FIG. 11 shows the effect of changing the transmission window using Quicksort on bandwidth, retransmission and execution time.

DETAILED DESCRIPTION OF THE PREFERRED EMBODIMENTS

The system according to a preferred embodiment of the present invention is implemented as follows:

(A) Client and Server Modules

FIG. 3 shows the client module that handles the paging operations on client-side. That client module has four major components: (1) The Block Device Interface (BDI), (2) a basic LRU-based write-back cache, (3) a mapping logic that tracks the location of swapped-out pages on different servers, and (4) a Remote Memory Access Protocol (RMAP) layer, which reliably handles communication between the client and servers. The pager issues read and write requests to the BDI in 4 KB data blocks. The BDI, in turn, performs read and write operations to the LRU-based write-back cache. When the cache reaches its capacity, one of the least-recently used dirty pages is evicted to one of the servers using RMAP. Furthermore, a dirty page is not written back to a server until it is chosen for eviction. FIG. 4 illustrates the server module which handles paging operations on the server side. The server module has two major components: (1) a hash table that stores client's pages along with client's identity (layer-2 MAC address of the client), and (2) the RMAP layer, which is similar to the client-side RMAP layer. Using these two components, the server module blindly stores and retrieves pages for any client in the cluster. Once the server reaches capacity, it responds to the requesting client with a negative acknowledgment. It is then the client's responsibility to select another server to store the page or to write to its local disk, if no other server is available. Both client and server modules use hash tables to map memory pages to server and client locations respectively. The hash tables structures themselves consume very little memory. The number of buckets in the hash table remains static upon startup and are allocated using the get free pages( ) call. Linked-lists contained within each bucket hold 64-byte entry structures that are managed using the Linux slab allocator (which performs fine-grained management of small, same-sized memory objects). The standard kmalloc( ) mechanism is not used as it causes unnecessary fragmentation.

(B) Transparent Virtualization

An important objective of the distributed Anemone system is to enable memory-intensive applications to transparently access remote memory resources without requiring any modifications, recompilation or relinking of neither the application nor the kernel. Anemone achieves this transparency using a pluggable block device driver, which can provided a block device interface (BDI) to the pager as a primary swap partition. Page-in/page-out requests can then be sent to the BDI instead of the local disk. Because BDI is implemented as a self-contained kernel module, it does not require changing the core OS kernel. In fact, one can invoke the open( ) operation on BDI just like any other standard block device. As a result, the BDI can also be treated as a low-latency store for temporary files and can even be memory-mapped by applications aware of the remote memory. Standard disk block devices interact with the kernel through a request queue mechanism, which permits the kernel to group spatially consecutive block I/Os (BIO) together into one "request" and schedule them using an elevator algorithm that minimizes disk seek latency. Unlike disks, Anemone's read-write latency is independent of the data block being accessed and does not suffer from seek latency overhead. Hence Anemone's BDI does not need to group sequential I/O requests together. Instead, client module bypasses the request queue and directly intercepts the BIOs before they are placed on the request queue. Hence, the Anemone client is able to skip the unnecessary overheads, dispatch the BIOs in their arrival order, and allow for their completion out of order. BDI maintains its own asynchronous transmission queue to buffer victim pages from the cache. It is best to set this queue size to a value that is just large enough where the pager will not be able to keep it full. However, caution needs to be taken in keeping the memory footprint of this queue at a minimum, usually a value around 1000 pages (which is a subset of the write-back cache).

(C) Remote Memory Access Protocol (RMAP)

RMAP is a tailor-made, low-overhead communication protocol which allows remote memory access within the same subnet. RMAP implements the following features: (1) Reliable Packet Delivery, (2) Flow-Control, and (3) Fragmentation and Reassembly. FIG. 2 illustrates the structure of an RMAP packet and its header. While one could technically implement RMAP on top of TCP, UDP, or even the IP protocol layers, this choice comes burdened with unwanted protocol processing. RMAP sits alongside IP but does not use any of IP's functions. Instead RMAP takes an integrated, faster approach by communicating directly with the network device driver, sending frames and handling reliability issues in a manner that suites the needs of the Anemone system. Every RMAP message is acknowledged except for keep alive and dynamic discovery messages. Timers trigger retransmissions when necessary (which is rare) to guarantee reliable delivery. A paging request cannot be allowed to be lost, or the application that depends on that page will fail altogether. RMAP also implements flow control to ensure that it does not overwhelm either the receiver or the intermediate network card and switches. However, RMAP does not require TCP's features such as byte-stream abstraction, in-order delivery, or congestion control. Hence RMAP is implemented as a lightweight window-based reliable datagram protocol. All client nodes keep a static-size window to control the transmission rate, which works very well for a purely in-cluster communication. The last design consideration in RMAP is that while the standard memory page size is 4 KB (or sometimes 8 KB), the maximum transmission unit (MTU) in traditional Ethernet networks is limited to 1500 bytes. RMAP implements dynamic fragmentation/reassembly for paging traffic. Additionally, RMAP also has the flexibility to use Jumbo frames, which are packets with sizes greater than 1500 bytes (typically between 8 KB to 16 KB). Jumbo frames enable the RMAP to transmit complete 4 KB pages to remote memory using a single packet, without fragmentation. The testbed includes an 8-port switch that supports Jumbo Frames (9 KB packet size). A 6% speed up was observed in RMAP throughput by using Jumbo Frames. All experiments were conducted with 1500 byte MTU with fragmentation/reassembly performed by RMAP.

(D) Resource Multiplexing

The distributed Anemone system performs two types of multiplexing in the presence of multiple clients and servers: (a) Any single client can transparently access memory from multiple servers as one pool via the BDI, and (b) Any single server can share its unused memory pool among multiple clients simultaneously. This provides the maximum flexibility in efficiently utilizing the global memory pool and avoids resource fragmentation.

(E) Distributed Resource Discovery

As servers constantly join or leave the network, the distributed Anemone system (a) seamlessly absorbs the increase/decrease in cluster-wide memory capacity, insulating the LMAs from resource fluctuations and (b) allows any server to reclaim part or whole of its contributed memory. This objective is achieved through distributed resource discovery described below. Clients can discover newly available remote memory in the cluster and the servers can announce their memory availability. Each server periodically broadcasts a Resource Announcement message (1 message every 10 seconds in the prototype) to advertise its identity and the amount of memory it is willing to contribute to LMAs on low-memory clients. Each client module maintains a server identity table in which MAC addresses of different servers and the memory capacity learned via Resource Announcements are constantly updated. Client module consults this table when selecting a server to perform page-out on a new page. Besides Resource Announcements, servers also piggyback their memory availability information in their page-in/page-out replies to individual clients. This distributed mechanism permits any new server in the network to dynamically announce its presence and allows existing servers to announce their up-to-date memory availability information to clients.

(F) Soft-State Refresh of Client and Server States

Distributed Anemone also includes soft-state refresh mechanisms to permit clients to track the liveness of servers and vice-versa. Firstly, the Resource Announcement message described above serves an additional purpose of informing the client that the server is alive and accepting paging requests. In the absence of any paging activity, if a client does not receive the server's Resource Announcement for three consecutive periods, it assumes that the server is offline and deletes the server's entries from its server identity table. If the client also had pages stored on that server that went offline, it needs to recover the corresponding pages from a copy stored either on the local disk on another server's memory. The soft-state refresh mechanism also permits servers to track the liveness of clients whose pages they store. Each client periodically transmits a Session Refresh message to each server that hosts its pages (1 message every 10 seconds in the prototype). Each Session Refresh message carries a client-specific session ID. The client module generates a different and unique Session ID each time the client restarts. If a server does not receive Session Refresh messages with matching Session IDs from a client for three consecutive periods, it concludes that the client has failed and frees up any pages stored on that client's behalf. When a client restarts after failure, its paging requests correspond to a Session ID that's different from previous sessions.

(G) Server Load Balancing

Memory servers themselves are commodity nodes in the network that have their own processing and memory requirements. Hence another design goal of the distributed Anemone is to a avoid overloading any one server node as far as possible by transparently distributing the paging load evenly. In the earlier centralized architecture, this function was performed by the memory engine which kept track of server utilization levels. Distributed Anemone implements additional coordination among servers and clients to exchange accurate load information. Clients utilize the server load information gathered from resource discovery to decide the server to which they send each new page-out request. This decision process is based upon one of two different criteria: (1) The number of pages stored at each active server, and (2) The number of paging requests serviced by each active server. While (1) attempts to balance the memory usage at each server, (2) attempts to balance the request processing overhead. There is a small time window between successive Resource Announcement requests from a server when a client may not have accurate server load information. Assume that client sends a new page-out request to a server, and the server finds itself overloaded (based upon a threshold of memory capacity or request throughput). In this case, the server sends a negative acknowledgment to the client, declining to store the new page. The client can then either select a different server or store the page to local disk, if no other server is available.

(H) Fault-Tolerance

The ultimate consequence of failure in swapping to remote memory is no worse than failure in swapping to local disk. However, the probability of failure is greater in a LAN environment because of multiple components involved in the process, such as network cards, connectors, switches etc. At the communication protocol level, Anemone implements the RMAP protocol to ensure reliable transfer of memory pages across the network. Additionally, two alternatives for tolerating server failures are proposed: (1) To maintain a local disk-based copy of every memory page swapped out over the network. This provides same level of reliability as disk-based paging, but risks performance interference from local disk activity; and (2) To keep redundant copies of each page on multiple remote servers. This approach avoids disk activity and reduces recovery-time, but consumes bandwidth, reduces global memory pool and is susceptible to network failures.

(I) Performance

The Distributed Anemone prototype was evaluated, with the goal answering the following key questions: (1) Latency: What reduction in paging latency does Anemone deliver when compared to disk-based paging? How do the latency distributions of Anemone vary across sequential/random access patterns? (2) Speedup: What application speedups can be obtained with Anemone for real-world unmodified applications? How do the speedups compare against using local memory and against swapping to disk? How do the speedups vary when executing multiple LMAs within a single client? (4) Protocol Performance: To what extent do the overheads due to RMAP affect paging performance?

The results can be summarized as follows. Distributed Anemone reduces read latencies to an average 160 μs compared to 8.3 ms average for disk and 500 μs average for centralized Anemone. For writes, both disk and Anemone deliver similar latencies due to write caching. In these experiments, Anemone delivers a factor of 1.5 to 4 speedup for single process applications, and delivers up to a factor of 14 speedup for multiple concurrent applications. The distributed Anemone system can successfully operate in the presence of both multiple clients and multiple servers.

The experimental testbed consisted of one 64-bit low-memory AMD 2.0 GHz client machine containing 256 MB of main memory and nine remote-memory servers. The servers consisted of: four 512 MB machines, three 1 GB machines, one 2 GB machine, one 3 GB machine. The 512 MB servers range from 1.7 GHz to 800 MHz Intel processors. The other 5 machines are all 2.7 GHz and above Intel Xeons. One of the 1 GB memory machines is also a 64-bit machine, which is used to perform experiments with multiple-client workloads on the system as described later. When active, the cluster contains a total of about 9.6 GB of usable memory (after accounting for local memory usage within each machine). For disk based tests, a Western Digital WD800JD 80 GB SATA disk, with 7200 RPM speed, 8 MB of cache and 8.9 ms average seek time was used, (which is consistent with the results). This disk has a 10 GB swap partition reserved on it to match the equivalent amount of remote memory available in the cluster, which is used exclusively when comparing the Distributed Anemone system against the disk. Each machine is equipped with an Intel PRO/1000MT gigabit Ethernet card connected to two 8-port gigabit switches, one from Netgear and one from SMC.

A page-in operation is more time-critical than page-out operation because the application cannot proceed without the required page. The various components of the latency in processing a 4 KB page-in request from the Pager involves the following steps: (1) The client module looks up the offset-to-server mapping in its mapping table. (2) The client transmits a request for the page directly to the server. (3) The server looks up the page for that offset and transmits the requested page directly back to the client. (4) The client module returns the page back to the Pager and the process resumes. The entire sequence requires only 2 network transmissions and only a few microseconds of processing time. Again, on a per-latency basis, a single page-in request takes 160 microseconds average with a standard deviation of 22 $\mu$s, which is about 50 times faster than page-in requests to disk.

The distribution of observed read and write latencies was next examined for sequential and random access patterns. FIG. 5 compares the cumulative distributions of latencies with disk and Anemone for random and sequential read requests. Similarly, FIG. 6 compares the two for random and sequential write requests. Though real-world applications rarely generate purely sequential or completely random memory access patterns, these graphs provide a useful measure to understand the underlying factors that impact application execution times. For random read requests in FIG. 5, most requests to disk experience a latency between 5 to 10 milliseconds. On the other hand most requests in Anemone experience only around 160 microsecond latency. For sequential read requests in FIG. 5, disk shows a slightly superior latency distribution than Anemone. Most sequential requests are serviced by the on-board disk cache within 3 to 5 microseconds because sequential read accesses fit well with the motion of disk head, eliminating seek and rotational overheads. In contrast, Anemone still delivers a range of latency values, most below 100 microseconds. This is because network communication latency dominates in Anemone even for sequential requests, though it is masked to some extent by the prefetching performed by the pager and file-system. The write latency distributions for both disk and Anemone in FIG. 6 are comparable to each other, with most latencies being close to 9 microseconds because writes typically return after writing to the disk cache or Anemone's client cache.

The first application tested is a graphics rendering program called POV-Ray [20]. The memory consumption of POV-Ray was varied by rendering different scenes with increasing number of spheres. FIG. 7 shows the completion times of these increasingly large renderings up to 3.4 GB of memory versus the disk using an equal amount of local swap space. FIG. 7 clearly shows that Anemone delivers increasing application speedups with increasing memory usage and is able to improve the execution time of a single-process POV-ray by a factor of 4 for 3.4 GB memory usage. The second application is a large in-memory Quicksort program that uses an STL based implementation from SGI [21], with a complexity of O(N log N) comparisons. Randomly populated large in-memory arrays of integers were sorted. FIG. 8 shows that Anemone delivers speedup of factor of 2.4 for single-process Quicksort having 5 GB memory usage. The third application is the popular network simulator NS2[26]. A delay partitioning algorithm on a 6-hop wide-area network path using voice-over-IP traffic traces was simulated. With NS2 requiring 1 GB memory, Anemone speeds up the simulation by a factor of 4 compared to disk based paging. The fourth application is the k-nearest neighbor (KNN) search algorithm on large 3D datasets, which are useful in applications such as medical imaging, molecular biology, CAD/CAM, and multimedia databases. When executing KNN search algorithm over a dataset of 2 million points consuming 1.5 GB memory, Distributed Anemone speeds up the simulation by a factor of 3.7 over disk based paging.

The performance of Distributed Anemone system was tested under varying levels of concurrent application execution. Multiple concurrently executing memory-intensive processes tend to stress the system by competing for computation, memory and I/O resources and by disrupting any sequentiality in the paging activity. FIGS. 9 and 10 show the execution time comparison of Anemone and disk as the number of POV-ray and Quicksort processes increases. The execution time measures the time interval between the start of the multiple process execution and the completion of last process in the set. Each process consumes 100 MB of memory. FIGS. 9 and 10 show that the execution times using disk-based swap increases steeply with number of concurrent processes. The paging activity loses sequentiality with increasing number of processes, making the disk seek and rotational overheads dominant.

On the other hand, Anemone reacts very well to concurrent system activity and the total execution time increases at a much slower pace. This is because, unlike disk based paging, Anemone encounters a steady paging latency over the network even as the paging activity loses sequentiality of access. With 12-18 concurrent memory-intensive processes, Anemone achieves speedups of a factor of 14 for POV-ray and a factor of 6.0 for Quicksort.

One of the important knobs in RMAP's flow control mechanism is the client's transmission window size. Using a 1 GB Quicksort, FIG. 11 shows the effect of changing this window size on three characteristics of the Anemone's performance: (1) The number of retransmissions, (2) Paging bandwidth, which is represented in terms of "goodput", i.e. the amount of bandwidth obtained after excluding retransmitted bytes and (3) Application completion time. As the window size increases, the number of retransmissions increases because the number of packets that can potentially be delivered back-to-back also increases. For larger window sizes, the paging bandwidth is also seen to increase and saturates because the transmission link remains busy more often delivering higher "goodput", in spite of an initial increase in number of retransmissions. However, if driven too high, the window size will cause the paging bandwidth to decline considerably due to increasing number packet drops and retransmissions.

The application completion times depend upon the paging bandwidth. Initially, an increase in window size increases the paging bandwidth and lowers the completion times. Similarly, if driven too high, the window size causes more packet drops, more retransmissions, lower paging bandwidth and higher completion times.

To measure the control traffic overhead due to RMAP, the percentage of control bytes generated by RMAP compared to the amount of data bytes transferred while executing a 1 GB POV-Ray application is measured. Control traffic refers to the page headers, acknowledgments, resource announcement messages, and soft-state refresh messages. The number of servers is first varied from 1 to 6, while a single client was executing the POV-Ray application. Next, the number of clients is varied from 1 to 4 (each executing one instance of POV-Ray), with 3 memory servers. The percentage overhead of control traffic was consistently measured to be around 1.74%—a very small overhead for the amount of page data transmitted.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

REFERENCES

[1] A. Acharya and S. Setia. Availability and utility of idle memory in workstation clusters. In Measurement and Modeling of Computer Systems, pages 35-46, 1999.
[2] T. Anderson, D. Culler, and D. Patterson. A case for NOW (Networks of Workstations). IEEE Micro, 15(1):54-64, 1995.
[3] T. Anderson, M. Dahlin, J. Neefe, D. Patterson, D. Roselli, and R. Wang. Serverless network file systems. In Proc. of the 15th Symp. on Operating System Principles, pages 109-126, Copper Mountain, Colo., December 1995.
[4] P. Bohannon, R. Rastogi, A. Silberschatz, and S. Sudarshan. The architecture of the dali main memory storage manager. Bell Labs Technical Journal, 2(1):36-47, 1997.
[5] F. Brasileiro, W. Cirne, E. B. Passos, and T. S. Stanchi. Using remote memory to stabilise data efficiently on an EXT2 linux file system. In Proc. of the 20th Brazilian Symposium on Computer Networks, May 2002.
[6] D. corner and J. Griffoen. A new design for distributed systems: the remote memory model. Proceedings of the USENIX 1991 Summer Technical Conference, pages 127-135, 1991.
[7] F. M. Cuenca-Acuna and T. D. Nguyen. Cooperative caching middleware for cluster-based servers. In Proc. of 10th IEEE Intl. Symp. on High Performance Distributed Computing (HPDC-10), August 2001.
[8] M. Dahlin, R. Wang, T. E. Anderson, and D. A. Patterson. Cooperative caching: Using remote client memory to improve file system performance. In Operating Systems Design and Implementation, pages 267-280, 1994.
[9] S. Dwarkadas, N. Hardavellas, L. Kontothanassis, R. Nikhil, and R. Stets. Cashmere-VLM: Remote memory paging for software distributed shared memory. In Proc. of Intl. Parallel Processing Symposium, San Juan, Puerto Rico, pages 153-159, April 1999.
[10] M. Feeley, W. Morgan, F. Pighin, A. Karlin, H. Levy, and C. Thekkath. Implementing global memory management in a workstation cluster. Operating Systems Review, Fifteenth ACM Symposium on Operating Systems Principles, 29(5):201-212, 1995.
[11] E. Felten and J. Zahorjan. Issues in the implementation of a remote paging system. Technical Report TR 91-03-09, Computer Science Department, University of Washington, 1991.
[12] M. Flouris and E. P. Markatos. The network RamDisk: Using remote memory on heterogeneous NOWs. Cluster Computing, 2(4):281-293, 1999.
[13] H. Garcia-Molina, R. Abbott, C. Clifton, C. Staelin, and K. Salem. Data management with massive memory: a summary. Parallel Database Systems. PRISMA Workshop, pages 63-70, 1991.
[14] H. Garcia-Molina, R. Lipton, and J. Valdes. A massive memory machine. IEEE Transactions on Computers, C-33 (5):391-399, 1984.
[15] S. Ioannidis, E. P. Markatos, and J. Sevaslidou. On using network memory to improve the performance of transaction-based systems. In International Conference on Parallel and Distributed Processing Techniques and Applications (PDPTA '98), 1998.
[16] S. Koussih, A. Acharya, and S. Setia. Dodo: A user-level system for exploiting idle memory in workstation clusters. In Proc. of the Eighth IEEE Intl. Symp. on High Performance Distributed Computing (HPDC-8), 1999.
[17] Ian M. Leslie, Derek McAuley, Richard Black, Timothy Roscoe, Paul T. Barham, David Evers, Robin Fairbairns, and Eoin Hyden. The design and implementation of an operating system to support distributed multimedia applications. IEEE Journal of Selected Areas in Communications, 14(7):1280-1297, 1996.
[18] E. P. Markatos and G. Dramitinos. Implementation of a reliable remote memory pager. In USENIX Annual Technical Conference, pages 177-190, 1996.
[19] I. McDonald. Remote paging in a single address space operating system supporting quality of service. Tech. Report, Dept. of Computing Science, University of Glasgow, Scotland, UK, 1999.
[20] POV-Ray. The persistence of vision raytracer, 2005.
[21] Silicon Graphics, Inc. STL Quicksort www.sgi.com/tech/stl/sort.html.
[22] E. Stark. SAMSON: A scalable active memory server on a network, August 2003.
[23] T. M. Wong and J. Wilkes. My cache or yours? Making storage more exclusive. In Proc. of the USENIX Annual Technical Conference, pages 161-175, 2002.
[24] L. Xiao, X. Zhang, and S. A. Kubricht. Incorporating job migration and network RAM to share cluster memory resources. In Proc. of the 9th IEEE Intl. Symposium on High Performance Distributed Computing (HPDC-9), pages 71-78, August 2000.
[25] C. Amza and A. L. Cox et. al. Treadmarks: Shared memory computing on networks of workstations. IEEE Computer, 29(2):18-28, February 1996.
[26] NS2: Network Simulator. http://www.isi.edu/nsnam/ns/.

What is claimed is:

1. A distributed memory system comprising a processor and memory, the system configured to:
   extract memory page information from at least one communication packet received via a communication network;
   transmit an acknowledgement after analyzing the memory page information and verifying that the memory page information represents an entirety of a memory page, independent of whether the memory page information comprises more than one packet;
   send, via the communication network, a request for retrieval of a required memory page from at least one memory server of a plurality of memory servers; and receiving the required memory page substantially without a centralized coordination of the plurality of memory servers.

2. The distributed memory system according to claim 1, further configured to evict a memory page and discover available memory storage capacity for remote storage of evicted memory pages in at least one memory server.

3. The distributed memory system according to claim 2, further configured to receive a periodic broadcast of a message indicating an amount of available memory.

4. The distributed memory system according to claim 2, further configured to store a table of available memory storage capacity at a plurality of destinations and select a respective destination in dependence on the table.

5. The distributed memory system according to claim 2, further configured to store a table of available destinations and history information and determine a destination liveness in dependence on the table.

6. The distributed memory system according to claim 2, further configured to redundantly store an evicted memory page in a local resource which does not communicate though the communication network.

7. The distributed memory system according to claim 2, further configured to redundantly store an evicted memory page in a plurality of destinations though the communication network.

8. The distributed memory system according to claim 7, further configured to select one of the redundantly stored evicted memory pages for retrieval of the evicted memory page.

9. The distributed memory system according to claim 2, wherein an evicted memory page is associated with a session, the system being further configured to periodically transmit liveness messages comprising an identification of the session through the communication network.

10. The distributed memory system according to claim 2, further configured to monitor communications on the communication network relating to other distributed memory clients, determine at least a number of paging requests serviced by each of a plurality of memory servers, and balance a memory page servicing of the plurality of memory servers.

11. The distributed memory system according to claim 2, further configured to monitor communications on the communication network relating to other distributed memory clients, determine at least a number of paging requests serviced by each memory server and a number of pages stored at each of a plurality of memory servers, and balance memory utilization and memory page servicing of the plurality of memory servers.

12. The distributed memory system according to claim 2, further configured to receive a negative acknowledgment from a first memory server declining to store an evicted memory page, and select a second memory server to resend the evicted memory page to.

13. The distributed memory system according to claim 1, wherein a memory page is communicated through the communication network in conjunction with memory availability information.

14. The distributed memory system according to claim 1, further configured to receive memory pages from corresponding distributed memory clients acting as memory server, through the communication network.

15. The distributed memory system according to claim 14, wherein a message comprising memory availability information and an acknowledgment are communicated in a single packet.

16. The distributed memory system according to claim 1, further configured to monitor communications on the automated communication network relating to other distributed memory clients, determine at least a number of pages stored at each of a plurality of memory servers, and balance a memory utilization of the plurality of memory servers.

17. A distributed memory method, comprising:
extracting memory page information from at least one communication packet;
transmitting an acknowledgement after analyzing the memory page information and verifying that the memory page information represents an entirety of a memory page, independent of whether the received memory page information comprises more than one communication packet;
requesting a selected memory page from at least one memory server of a plurality of memory servers; and
receiving the selected memory page substantially without a centralized coordination of the plurality of memory servers.

18. The distributed memory method according to claim 17, further comprising:
discovering available memory storage capacity for remote storage of evicted memory pages by communicating a periodic broadcast of a message indicating an amount of available memory, wherein a content and a timing of a respective message is indicative of a liveness of a sender of the message; and
selectively communicating a memory page, as information in at least one communication packet through an automated communication network to at least one sender of the message in dependence on the indicated liveness;
receiving an acknowledgement of successful receipt of the communicated memory page; and
evicting the memory page from memory after receipt of the acknowledgement of successful receipt.

19. The distributed memory method according to claim 18, further comprising:
redundantly storing an evicted memory page in a local resource which does not communicate though the automated communication network and in a plurality of destinations in the automated communication network;
monitoring communications over the packet-based automated communication network to determine respective loads on the plurality of destinations; and
balancing the load on the plurality of destinations.

20. A computer readable storage medium storing therein instructions for managing distributed memory, the computer readable storage medium comprising:
instructions for extracting memory page information from at least one communication packet;
instructions for transmitting an acknowledgement after analyzing the memory page information and verifying that the memory page information represents an entirety of a memory page, independent of whether the received memory page information comprises more than one communication packet; and
instructions for requesting a memory page from at least one memory server of a plurality of memory servers substantially without a centralized coordination of the plurality of memory servers.

* * * * *

UNITED STATES PATENT AND TRADEMARK OFFICE
CERTIFICATE OF CORRECTION

PATENT NO. : 8,417,789 B1
APPLICATION NO. : 13/278319
DATED : April 9, 2013
INVENTOR(S) : Gopalan et al.

It is certified that error appears in the above-identified patent and that said Letters Patent is hereby corrected as shown below:

On the Title Page, in item (74), under "Attorney, Agent, or Firm", in Column 2, Line 1, delete "Woodcok" and insert -- Woodcock --, therefor.

On the Title Page, in item (57), under "ABSTRACT", in Column 2, Line 13, delete "relinkling" and insert -- relinking --, therefor.

Title Page 2, in item (56), under "OTHER PUBLICATIONS", in Column 1, Line 17, delete "Inti." and insert -- Intl. --, therefor.

Title Page 2, in item (56), under "OTHER PUBLICATIONS", in Column 1, Line 23, delete "Inti." and insert -- Intl. --, therefor.

Title Page 2, in item (56), under "OTHER PUBLICATIONS", in Column 2, Line 22, delete "Inti." and insert -- Intl. --, therefor.

Title Page 2, in item (56), under "OTHER PUBLICATIONS", in Column 2, Line 44, delete "Inti." and insert -- Intl. --, therefor.

In the Specification

In Column 8, Line 1, delete "provided" and insert -- provide --, therefor.

In Column 13, Line 45, delete "corner" and insert -- Comer --, therefor.

In the Claims

In Column 15, Line 21, in Claim 6, delete "though" and insert -- through --, therefor.

Signed and Sealed this
Twenty-seventh Day of August, 2013

Teresa Stanek Rea
*Acting Director of the United States Patent and Trademark Office*

CERTIFICATE OF CORRECTION (continued)
U.S. Pat. No. 8,417,789 B1

In Column 15, Line 25, in Claim 7, delete "though" and insert -- through --, therefor.

In Column 15, Line 54, in Claim 12, delete "page to." and insert -- page. --, therefor.

In Column 16, Line 42, in Claim 19, delete "though" and insert -- through --, therefor.